United States Patent Office 3,145,232
Patented Aug. 18, 1964

3,145,232
OZONIZATION AND REDUCTION OF UNSATURATED ORGANIC COMPOUNDS
Quentin E. Thompson, Belleville, Ill., assignors to Monsanto Company, a corporation of Delaware
No Drawing. Filed Nov. 3, 1959, Ser. No. 850,512
5 Claims. (Cl. 260—586)

This invention relates to organic compounds having carbon to carbon unsaturation and is more particularly concerned with a process for reducing the ozonization products of such compounds to their carbonyl derivatives.

The ozonization of these unsaturated compounds, and the subsequent reduction of the products thereof, has been found useful as a novel method of preparing carbonyl compounds. The ozonization and reduction steps of this invention are particularly useful in synthesizing steroidal compounds.

The prior art teaches the use of a wide variety of reducing agents for the conversion of ozonization products to their carbonyl derivatives. In general, catalytic hydrogenation, reduction with metal-acid combinations, and reduction with the acidified iodide ion have been most regularly employed. It has been found that the aldehydic and ketonic products are more readily and regularly obtained when ozonization is effected in the presence of a hydroxylic solvent at low temperatures of —40° C, or below and reduction at such temperatures follows immediately. This is due to the fact that the ozonization products of many carbon to carbon unsaturated organic compounds undergo changes at the higher temperatures, and accordingly the yield from the reduction step is adversely affected. Therefore, the ozonization should be followed immediately by reduction at the lowest possible temperature. However, the principal problem presented by such a method is the severe diminution of activity of the reducing agent at the aforesaid lowered temperatures. The result of such a failing is often apparent in poor yields of the desirable cleavage products.

Accordingly, it is a primary object of this invention to provide a new and improved method for the ozonization of organic compounds having carbon to carbon unsaturation and the subsequent reduction of the products arising from the ozonization reaction.

More specifically, it is an object of this invention to provide such a method wherein the agent for reducing the ozonized compounds exhibits a low temperature activity which is superior to that of the agents presently employed.

These objects are achieved by the use of a trialkyl phosphite as the reducing agent. It is preferred to employ a phosphite containing the lower alkyl groups such as methyl, ethyl, propyl, isopropyl, butyl, sec.-butyl and tert.-butyl. As noted above, the unsaturated compound is ozonized in a hydroxylic solvent. The use of lower aliphatic alcohols as solvents is preferred. Such alcohols include methanol, ethanol, 2-propanol, 2-methyl-2-propanol, and 1- and 2-butanol. Other ozone-resistant hydroxylic solvents, e.g. higher monohydric or polyhydric alcohols such as ethylene glycol, diethylene glycol, etc., may also be employed. The primary consideration in the selection of a solvent is that it should not be attacked appreciably by the ozone. Mixtures of the aforementioned alcohols with such common inert ozonization solvents as hexane, methyl chloride, methylene chloride, chloroform, carbon tetrachloride, ethyl chloride, ether, tetrahydrofuran, acetonitrile and the like may also be employed.

Ozonization may be carried out at temperatures of —40° C. and below. Immediately upon completion thereof, the selected phosphite is added to the solution to achieve a rapid reduction. However, it should be noted that the reducing activity of the phosphites is not diminished when employed at higher temperatures such as room temperature. Thus it is apparent that where the unsaturated compound is such that its ozonization products are not adversely affected by such higher temperatures, said products are also readily reduced by the addition of a trialkyl phosphite at these higher temperatures. In all cases, regardless of the temperature of the reaction, at least an equimolar amount of phosphite should be employed relative to the unsaturated organic compound.

The carbonyl derivatives formed during the reduction may be isolated from solution by distillation, extraction or other common laboratory isolation techniques. In those instances where isolation by such a step is impractical, extremely difficult or unnecessary, a suitable carbonyl reagent may be added to convert said derivatives to solid condensation products. Typical of such reagents are phenylhydrazines, semicarbazide and hydroxylamine. The trialkyl phosphate which is formed as the co-product during the reduction is relatively inert and will not interfere with the conversion procedure.

The invention will be more fully understood by reference to the following examples. These examples, however, are presented for the purpose of illustration only and are not to be construed as limiting the scope of the present invention in any way.

Example I

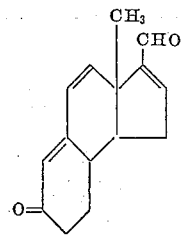

A solution of 2.14 grams (10 millimoles) of (—) anti-trans - 4,4a,4b,5,8,8a - hexahydro-8a-methyl-2(3H)-phenanthrone was dissolved in 30 ml. of methylene chloride and diluted with 30 ml. of methanol. A standardized ozone-oxygen stream delivering 0.70 millimole of ozone per minute was added at —60° C. until 10 millimoles of ozone had been absorbed. Addition of ozone was then terminated, and 3.0 ml. of trimethyl phosphite was added. A slight temperature rise was noted, and the reaction mixture was permitted to come to room temperature over one hour. The solvents were removed under vacuum on a rotating drier, and the clear oily residue was then heated at 60–80° C./0.5 mm. to remove phosphate esters. The crude dialdehyde which remained was cyclized in benzene using the piperidine-acetic acid method of Woodward, J. A. C. S. 74, 4223 (1952). A total of 1.635 grams of crude 1(—)anti-trans-3a,7,8,9,9a,9b-hexahydro-3a - methyl - 7-oxo-(1H)-benz[e]indine-3-carboxaldehyde was obtained. This product was dissolved in ether and was then put through a short column of alumina. A yield of 1.233 grams (54% of theory) was obtained as almost colorless crystals. Two recrystallizations from ether gave the final product, M.P. 124.5–126° C. Analysis showed 79.14% carbon and 7.25% hydrogen as compared with calculated values of 78.91% and 7.06% respectively for $C_{15}H_{16}O_2$.

Example II

One gram (3.55 millimoles) of dl-3-keto-$\Delta^{4,9(11),16}$-D-homoandrostatriene was dissolved in 50 ml. of methylene chloride to which was then added 50 ml. of methanol. The solution was treated for about 5 minutes with ozone at —60° C. as in the preceding example. Reduction was accomplished by the addition of 2 ml. of trimethyl phosphite. The reaction product was worked up and cyclized in the manner described in Example I. A total yield of 57% of theory was obtained, M.P. 160–161° C. As a comparison, the identical experiment was run with ozonization carried out at 0°. The total yield was reduced to only 28%.

In order to further illustrate the results achieved by the process of this invention, the following table shows the yields obtained using other and different organic compounds having carbon to carbon unsaturation. In each instance 25 millimoles of the unsaturated compound in about 50 ml. of methanol (about 50 ml. of methylene chloride may also be added) was treated with ozone at about —60° C. until 25 millimoles of ozone had been absorbed. At least 25 millimoles of a phosphite was then added to the cold solution. The isolation of the derivatives was effected by the addition of about 50–55 millimoles of p-nitrophenylhydrazine or semicarbazide in methanol or another suitable solvent, followed by heating for a short period of time on a steam bath.

scribed herein may be employed for similar purposes with any of the polycyclic compounds having olefinic unsaturation.

It is to be understood that the above-described examples are merely illustrative of the applications of the principles of the invention. Numerous modifications and variations may be devised by those skilled in the art without departing from the spirit and scope of the invention.

What is claimed is:

1. In a process for preparing a carbonyl derivative of the product resulting from the ozonization of an organic compound having carbon to carbon unsaturation, such ozonization being carried out in the presence of an inert hydroxylic solvent, the improvement of contacting said product with a lower trialkyl phosphite at a temperature of less than about —40° C., at least an equimolar quantity of phosphite, relative to said compound, being employed.

2. The propcess defined in claim 1 wherein the phosphite is trimethyl phosphite.

| Unsaturated Compound | Carbonyl Product(s) | Percent Yield | Isolated as | M.P., degrees |
|---|---|---|---|---|
| Cyclohexene | Adipaldehyde | 85 | Disemicarbazone | 193–195 |
| 3-methylcyclohexene | 3-methyladipaldehyde | 77 | Di-p-nitrophenylhydrazone | 163–164 |
| Trans-stilbene | benzaldehyde | 84 | Semicarbazone | 220–222 |
| Indene | homophthalaldehyde | 65 | Di-p-nitrophenylhydrazone | 218–220 |
| Phenanthrene | 2,2'-diphenyldicarboxaldehyde | 100 | Di-p-nitrophenylhydrazone | 265–266 |
| Dibutyl maleate | butyl glyoxylate | 78 | Semicarbazone | 220–222 |
| Cinnamic acid | benzaldehyde | 86 | ___do___ | 220–222 |
|  | glyoxylic acid | 30 | ___do___ | 209–210 |
| Phenylacetylene | phenylglyoxal | 40 | Di-p-nitrophenylhydrazone | 310–312 |
| 1,4-butynediol diacetate | 1,4-diacetoxy-1,2-butanedione | 65 | ___do___ | 290–310 |

As illustrative of the increased yields obtained employing the process of this invention, it should be noted that previous methods yielded 54% with cyclohexene as the unsaturated compound, 84% with phenanthrene, and 35% with 1,4-butynediol diacetate.

As noted above, the process of this invention has particular utility in steroid synthesis. One of the important steps in such syntheses involves the contraction of a six membered ring to the corresponding five membered aldehyde. The prior art has shown this contraction to be both multi-step and laborious. However, as illustrated in Examples I and II, the process of the invention permits substantial simplification of the ring contraction procedure. Further, the yields obtained in said examples are from 50 to 100% greater than those obtained by methods now in use. It should be noted that while said examples are directed to tri- and tetracyclic compounds respectively, the ozonization and reduction process de- 3. The process defined in claim 1 wherein said organic compound is a polycyclic compound having olefinic unsaturation.

4. The process defined in claim 1 wherein said solvent is a lower aliphatic alcohol.

5. The process defined in claim 4 wherein the phosphite is trimethyl phosphite.

References Cited in the file of this patent

UNITED STATES PATENTS

| 2,781,401 | Jacobsen | Feb. 12, 1957 |
| 2,854,459 | Knowles et al. | Sept. 30, 1958 |
| 2,888,485 | Bailey | May 26, 1959 |

OTHER REFERENCES

Migrdichian: Organic Synthesis, vol. II, pages 902–11 (1957).